United States Patent Office 3,386,939
Patented June 4, 1968

3,386,939
ACRYLIC DISPERSIONS FOR WIRE ENAMELS
Kenneth J. Mesec, Arlington Heights, Ill., assignor to E. I. du Pont de Nemours and Company, Wilmington, Del., a corporation of Delaware
No Drawing. Continuation-in-part of application Ser. No. 414,440, Nov. 27, 1964. This application Sept. 22, 1967, Ser. No. 669,673
13 Claims. (Cl. 260—29.3)

ABSTRACT OF THE DISCLOSURE

An aqueous dispersion of a water-insoluble interpolymer prepared by
(1) treating a latex with air wherein the polymer of the latex consists essentially of 1–15% by weight of an $\alpha,\beta$-unsaturated carboxylic acid, 30–80% by weight of a nitrile of the formula

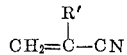

where $R^1$ is either hydrogen or methyl and 15–65% of acrylic acid ester or a methacrylic acid ester; and
(2) reacting the air treated latex with an alkylene imine to form a polymer having pendent aminoester radicals, or hydroxyamide radicals or a mixture of these radicals.

---

This application is a continuation-in-part of the copending application, Ser. No. 414,440, filed Nov. 27, 1964, now abandoned.

This invention relates to a novel aqueous dispersion of a polymeric coating composition which is capable of being deposited and cured to a coalesced polymer composition having improved electrical insulation properties.

Aqueous dispersion coating compositions consisting essentially of water-insoluble coalescible copolymer which has as the major components acrylonitrile and esters of acrylic and methacrylic acid are well recognized as being useful for electrical insulation, e.g., as wire enamels, impregnants for electrical insulating fabrics, such as glass fabric, and other heat resistance textile fabrics. U.S. Patents 2,787,561; 2,787,603; 2,866,763 and 3,069,375 show coating compositions such as these and teach novel processes for making them.

The novel product resulting from the process of this invention surprisingly has improved properties over the aforementioned prior art acrylonitrile polymers. In this invention, a carboxylic polymer latex is treated with air and then is subsequently reacted with an alkylene imine to give a composition that will form an electrical insulation of uniform quality, and in comparison to the aforementioned prior art composition, this composition has superior flexibility which results in improved performance under coil winding operations and has greatly improved resistance to chlorofluoroalkane refrigerants, e.g., "Freon 22."

"Carboxylic polymer latex" designates an aqueous dispersion of a substantially water-insoluble interpolymer present in the form of very fine particles, which interpolymer contains pendent carboxyl groups (—COOH) or their salts (e.g., —COONH$_4$) and is the product of at least one monomer containing both polymerizable olefinic unsaturation and a carboxylic acid group with at least one other monomer which is copolymerizable therewith.

The novel aqueous dispersion of this invention results from the process of treating a carboxylic polymer latex with at least 10 cubic centimeters of air per pound of latex followed by imination with an alkylene imine. The carboxylic polymer of the latex consists essentially of monomer units of (A) 1 to 15% by weight of the carboxylic polymer of at least one alpha,beta-unsaturated carboxylic acid; (B) 30 to 80% by weight of at least one nitrile of the formula

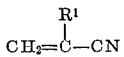

in which $R'$ is from the group of hydrogen and methyl; (C) 15 to 65% by weight of a methacrylic acid ester or an acrylic acid ester of a $C_1$ to $C_8$ saturated aliphatic monohydric alcohol or a mixture thereof.

This air treated carboxylic polymer latex is then reacted with sufficient alkylene imine of the formula Formula A

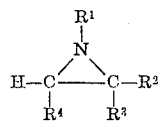

to react about 10 to 15% of the pendent COOH groups of the carboxylic polymer to form a negatively charged polymer which has attached to the carbon atoms of the polymer backbone pendent monovalent radicals which are either aminoester radicals or hydroxyamide radicals or a mixture of aminoester and hydroxyamide radicals. The pendent aminoester radical has the formula

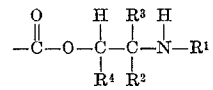

and the hydroxyamide radical has the formula

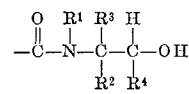

In the above formulas, $R^1$ is either hydrogen, benzyl or a $C_1$–$C_5$ alkyl radical, $R^2$ and $R^3$ are either hydrogen, benzyl, aryl or a $C_1$–$C_5$ alkyl radical, and $R^4$ is either hydrogen or $C_1$–$C_5$ alkyl radical. Preferably, $R^1$, $R^3$ and $R^4$ are hydrogen and $R^2$ is either hydrogen or methyl.

The resulting polymeric latex can be used without adjustment of the pH which usually is about 7. The process preferably includes adjustment of the pH of the latex by treating after the imination reaction with ammonium hydroxide or other volatile salt forming reactants, for example, volatile amines, which react with the remainder of the pendent carboxyl groups of the polymer to form a stable latex having a pH in the range of 7.5 to 8.

The resulting aqueous latex before and after the treatment with ammonia as indicated above has utility as a coating composition and as an impregnant; it is preferred, however, to still further include a suitable proportion of a coalescing agent with the latex, particularly those disclosed in Bullitt et al. U.S. Patent 3,069,375, issued Dec. 18, 1962, column 7, lines 19–33. The coalescing agent is a water-dispersible organic film-forming material which is compatible with the copolymer, e.g., water-dilutable heat reactive phenol/formaldehyde condensate or condensates of formaldehyde with urea, melamine, benzoquanamine or mixtures thereof. These condensates are usually modified with a monohydric alcohol. Useful proportions of these modifying film-forming materials range from about 1 to about 40 parts per 100 parts by weight of the novel polymer but preferably 3 to 20 parts are used.

Other coalescing agents may be used with novel aqueous dispersions of this invention which are water-soluble organic liquids which are solvents for the novel polymer and have a volatilization rate less than that of water. These agents may be present in an amount up to 150% by weight of the novel polymer and form an aqueous dispersion which can be easily applied under a wide variety of application conditions. In Example 6, the coalescing agent is shown to be tetramethylene sulfone. Other examples of water-soluble coalescing agents which may be employed include cyclic ethylene carbonate, dimethyl formamide, dimethyl acetamide, alkyl monoethers of ethylene glycol or diethylene glycol and diacetone alcohol.

To achieve the novel properties of the aqueous dispersion of this invention, the carboxylic polymer latex prior to imination is treated with at least 10 cubic centimeters of air per pound of latex, and preferably about 20 to 80 cubic centimeters of air per pound of latex. Treatment of the latex with air consists of intimately contacting the latex with air. This can be accomplished by bubbling the air through the latex while constantly agitating the latex, or by other methods which provide intimate contact. For an economical process, the latex is treated with 10 to 200 cubic centimeters of air per pound of latex over a period of 15 minutes to about 3 hours. Oxygen or peroxides, such as hydrogen peroxide, can also be used to treat the latex, however, air is preferred because of its low cost.

After the carboxylic polymer latex is treated with air, it is reacted with an alkylene imine. The reaction with the alkylene imine, which is often referred to as an aziridine compound, and the air treated carboxylic polymer latx is herein referred to as an "imination reaction." Sufficient alkylene imine is used to react about 10–50% and preferably 10–25% of the pendent COOH groups of the carboxylic polymer to form aminoester radicals or hydroxyamide radicals or a mixture of these radicals.

It is extremely desirable to form a polymer which has an overall negative charge imparted to it by the remaining pendent anionic carboxylic acid radicals (i.e., —COO⁻ groups). The overall negatively charged polymer provides the novel aqueous dispersion with increased stability, i.e., polymer coagulation is substantially reduced.

Particularly preferred alkylene imines are ethylenimine (Formula B) and 1,2-propylenimine (Formula C) because of their relatively low cost and plentiful supply and because they provide the product with desirable characteristics.

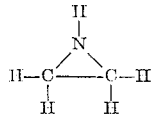
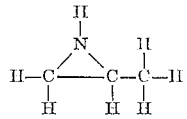

Formula B              Formula C

In the preferred procedure for carrying out the reaction with an alkylene imine, i.e., an imination reaction, the alkylene imine is mixed with the air treated carboxylic polymer latex in a reaction vessel under an atmosphere of nitrogen. The alkylene imine is slowly added to the latex with constant stirring and is reacted at about a temperature of 35 to 90° C. until the reaction is complete (e.g., about ½ hour at the higher temperature to about 12 hours at the lower temperature). The reaction product is cooled to room temperature. The upper temperature limit of the imination reaction is determined largely by how much heat the particular latex will withstand without coagulating. The entire reaction can be carried out at room temperature, but heating is much preferred because of the shorter reaction time.

The carboxylic polymer latex of this invention is prepared by known methods of emulsion polymerization in which a carboxylic acid monomer is reacted in an aqueous medium with at least two other copolymerizable monomers, e.g., acrylonitrile and an ester of acrylic acid. Preferably, after the carboxylic polymer latex is formed, the pH of the latex is adusted to about 5 to 7 with ammonium hydroxide or with a volatile amine.

The carboxylic polymer contains about 1 to 15% by weight and preferably 2 to 10% by weight of at least one alpha, beta-unsaturated carboxylic acid. A wide variety of alpha, beta-unsaturated carboxylic acids are useful in this invention, such as methacrylic acid, acrylic, itaconic acid, ethacrylic acid, phenyl acrylic acid, crotonic acid, partial esters of itaconic acid, maleic acid and fumaric acid esterified with a saturated aliphatic monohydric alcohol, or mixtures of these carboxylic acid monomers. Preferably, methacrylic acid, acrylic acid, ethacrylic acid and itaconic acid are used. Although carboxylic acid monoesters of the aforementioned dicarboxylic acids can be used as the sole carboxylic acid monomer, they are used preferably in combination with the aforementioned preferred carboxylic acid monomers.

An alpha, beta-unsaturated copolymerizable nitrile of the formula

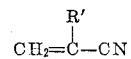

wherein R' is either hydrogen or methyl, is a necessary monomer constituent of the carboxylic polymer and is present in the amount of about 30 to 80% by weight. Preferably acrylonitrile is used in the amount of 45 to 75% by weight.

The other necessary monomer component of the carboxylic polymer is a neutral ester of any of the aforementioned acids fully esterified with a copolymerizable monohydric alcohol. Preferably, an acrylic acid ester or a methacrylic acid ester of a $C_1$ to $C_8$ saturated monohydric alcohol or a mixture thereof is used in the amount of 15 to 65% by weight, and more preferably 23 to 45% by weight Preferably, butyl acrylate is used in the amount of 23 to 45% by weight.

Certain other auxiliary copolymerizable ethylenically unsaturated monomers can be included in the carboxylic polymer in minor proportions from about 1 to 25% by weight of the polymer with the preferred amount being 1 to 10% by weight.

Auxiliary alpha ethylenically unsaturated monomers which can be used are free from carboxylic acid substitutents and contain no more than two sites of ethylenic unsaturation, each of which constitutes an alpha bound terminal methylene group. Useful auxiliary monomers having a single site of alpha ethylenic unsaturation include the vinyl aromatic hydrocarbons; such as styrene, alpha methyl styrene, vinyl toluene; allyl glycidyl ether and esters of epoxy alcohols, such as esters of 2,3-epoxypropanol-1 and a monoethylenically unsaturated monocarboxylic acid having an alpha bound terminal methylene group of which glycidyl methacrylate is a representative ester.

Typical useful auxiliary monomers containing two sites of alpha bound methylene unsaturation include divinyl benzene and diesters of polymethylene glycols and polyoxyalkylene glycols and a monoethylenically unsaturated monocarboxylic acid having an alpha bound terminal methylene group.

Typical of the known methods of making a carboxylic polymer latex useful in the practice of this invention are those described in U.S. Patents 2,395,017; 2,724,707; 2,787,603; 2,868,752; 2,868,754; 2,918,391; and 3,032,521, the disclosures of which are incorporated therein by reference. Especially pertinent is the method described in U.S. Patent 2,724,707, column 5, line 21 to column 6, line 60.

The emulsions used in preparing the carboxylic polymer latex are composed of the mixture of monomers, suitable emulsification and suspension agents (surfactants), buffering agents for pH control and a free radical catalyst; for example, potassium persulfate, a peroxide such as hydrogen peroxide, a diazo compound, such as azobisisobutyroamidine hydrochloride or a redox type, such as persulfate-sulfite, or mixtures of such catalysts. Polymerization can be carried out in the presence of a free radical catalyst in a closed vessel in an inert atmosphere and under autogenous pressure or under artificially induced pressure or in an open vessel under reflux at atmospheric pressure. The temperatures of the polymerization can be varied from 0° C. or lower to 100° C. or higher, preferably from 20° C. to 90° C., depending to a large degree upon the activity of the monomers and catalyst used and the molecular weight desired in the polymer product.

In the interest of obtaining a substantially water-insoluble carboxylic polymer and a stable latex product, it is usually best to add less than 15% acid monomer based on the total weight of monomer in the reaction mixture, while insuring, in any event, that the polymer after the aforementioned imination reaction contains at least 0.3% by weight of carboxylic monomer units. Thus, the iminated polymer product is characterized by having an overall negative charge imparted to it by the pendent carboxyl radicals and has attached to the carbon atoms of the polymer backbone monovalent radicals.

The acid content of the carboxylic polymer can be determined by separating the polymer from the aqueous phase, dissolving it in a solvent and titrating the resulting polymer solution with alcoholic KOH to a phenolphthalein end-point. The acid content can also be determined by complete chemical analysis of the polymer.

To disperse the water-insoluble monomers in the aqueous polymerization medium, soluble surfactants, emulsifiers or dispersants are used. Surfactants or dispersants useful in emulsifying the monomers and in maintaining the resulting copolymer in aqueous dispersion include water-soluble salts of fatty alcohol half esters of sulfuric acid, e.g., sodium and potassium lauryl sulfates and other such ester salts where the fatty alcohol contains from 8 to 24 carbon atoms, alkylphenoxypolyethanoxyethanols where the alkyl substituent contains from 7 to 12 carbon atoms, e.g., octyl and nonyl, and the polyethanoxyethanol group is of sufficient chain length to provide water-solubility, this group corresponding preferably to an adduct of 20 to 50 mols of ethylene oxide, water-soluble ethylene oxide derivatives of long chain fatty acids. Other ionic and nonionic water-soluble surfactants commonly used in aqueous emulsion polymerization are listed in "Synthetic Detergents" by J. W. McCutcheon, published annually by McNair-Dorland Company, New York.

Generally, the proportion of the water-soluble dispersant or emulsifier is about 0.01 to 5 parts based on 100 parts by weight of the monomers; preferably, about 0.03 part to 1 part are used. Generally, the dispersed polymer particles are substantially uniform in particle size, the average particle diameter is about 0.1 micron to 3 microns, and preferably about 0.2 to 0.5 micron.

An aquasol of alkali-stabilized silica particles in the particle size range of about 5 to 150 millimicrons can be used in lieu of the ordinary emusifying surfactants. An extremely small proportion of alkali, such as $Na_2O$, $K_2O$, $Li_2O$ and $NH_3$, is required to stabilize the silica particles, the $SiO_2$ ratio ordinarily being in the range of 75 to 700 parts of $SiO_2$ per part of the alkali expressed as $Na_2O$. Commercially available "Ludox" colloidal silica is typical of aquasols of the stabilized silica particles having the sub-micron particle size. Use of such silica particles in lieu of ordinary emulsifiers is more fully described and claimed in Bullitt et al. U.S. Patent 3,069,375. Copolymerization in the absence of ordinary water-soluble surfactants provides a latex characterized by an advantageously high surface tension which cannot be obtained in the presence of ionic and nonionic surfactants.

The following examples are provided to illustrate the principles and practice of the invention. Unless otherwise indicated, the parts and percentages are given by weight.

Example 1

The novel aqueous dispersion is prepared by first forming a latex of a carboxylic polymer having a composition of 63:32:5 acrylonitrile:butylacrylate:methacrylic acid, then treating this latex with air and then reacting the air treated latex with an alkylene imine.

LATEX A

| | Parts by weight |
|---|---|
| Portion 1: | |
| Deionized water | 4761.51 |
| Portion 2: | |
| Acrylonitrirle | 1824.84 |
| Butyl acrylate | 926.91 |
| Methacrylic acid | 144.83 |
| Portion 3: | |
| Deionizer water | 148.80 |
| "Ludox LS" * Colloidal Silica (30% silica dispersion) | 48.22 |
| Ferrous Ammonium sulfate | .04 |
| Portion 4: | |
| Deionized water | 297.59 |
| Ammonium persulfate | 3.95 |
| Sodium metabisulfite | 1.24 |
| Portion 5: | |
| Deionized water | 123.01 |
| Portion 6: | |
| Deionized water | 297.59 |
| Ammonium persulfate | 3.95 |
| Sodium metabisulfite | 1.24 |
| Portion 7: | |
| Ammonium hydroxide (28% aqueous solution) | 1.98 |
| Deionized water | 17.86 |
| Portion 8: | |
| Deionized water | 195.79 |
| Propylenimine | 54.67 |
| Portion 9: | |
| Deionized water | 138.87 |
| Total | 8992.89 |

*Registered Du Pont trademark.

Each of the monomers is of the ordinary commercially available inhibited grade of monomer. The acrylonitrile contains 25 p.p.m. of MEHQ, i.e., methylether of hydroquinone, as an inhibitor. The butyl acrylate contains 50 p.p.m. of MEHQ and the methacrylic acid contains 250 p.p.m. of MEHQ. The inhibitor content based on the total monomer combination is about 34.3 p.p.m.

"Ludox LS" colloidal silica is an aquasol of alkali-stabilized silica particles having a silica content of 30%. The ratio of $SiO_2$ to the stabilizing $Na_2O$ is about 285 to 1 and the approximate particle diameter of the silica particles is about 15 millimicrons. Other useful aquasols of stabilized silica particles are defined in Table 1 of U.S. Patent 3,069,375.

The multi-component portions are premixed before they are added. Portion 1 is charged into a conventional polymerization vessel equipped with stirrer, thermometer, and means to introduce reagents, and means of heating and cooling the reaction mixture. About 25% of Portion 2 is added to the vessel with continuous stirring. Portion 3 is added with stirring and the mixture is heated to about 126° F. Portion 4 is added with stirring and the exothermic reaction heats the mixture to about 170–180° F. The mixture is cooled to about 150° F. and the remainder of Portion 2 is added with constant stirring. Portions 5 and 6 are added with stirring and the reaction raises the temperature of the mixture to about 170–180° F. and the mixture is held at this temperature for about 1 hour and then cooled to 60° F. After Portion 7 is added with stirring, about 6 to 8 cubic feet of air (standard temperature and pressure) are bubbled through the latex for about 1 hour. Portions 8 and 9 are added with continuous stirring and then gradually the temperature of the mixture is raised to 122° F. over a 30 minute period and held at this temperature for 30 minutes. The reaction mixture is cooled to room temperature and is filtered to remove coagulum formed during the reaction.

LATEX B

Latex B is prepared using the identical monomeric components and the same procedure as used to prepare Latex A with the exception that the latex was not treated with air and the latex was not iminated with propylenimine, i.e., Portions 8 and 9 were omitted.

The completed Latex A has a total solids content of about 32% and Latex B has a total solids content of about 34.0%, and each has a pH of about 7.0 to 7.5.

WIRE ENAMEL

Latices A and B are converted into wire enamels by using the following procedure:

|  | Parts By Weight | |
| --- | --- | --- |
|  | Wire Enamel A | Wire Enamel B |
| Latex A (32% solids) | 807.33 |  |
| Latex B (34% solids) |  | 769.52 |
| Water-dilutable heat-reactive phenol/formaldehyde resin solution—66% solids (Bakelite Resin B RL-1100) | 44.64 | 43.62 |
| A 28% aqueous solution of ammonium hydroxide | 1.00 | 5.36 |
| Deionized water | 30.27 | 67.79 |
|  | 883.24 | 886.29 |

The above ingredients for Wire Enamel A and the ingredients for Wire Enamel B are each added in the above order to a separate reaction vessel and agitated for about 20 minutes. The resulting Wire Enamels A and B are filtered and each has a non-volatile film forming content of about 32%, a pH of about 7.0 to 7.5 and a Brookfield viscosimeter viscosity of approximately 50 centipoises at 25° C. using a #1 spindle with a Brookfield viscosimeter at 6 r.p.m.

Wire enamels A and B are each coated onto separate #18 gauge copper wires, using the wire coating procedure as outlined in Bullitt et al. U.S. Patent 3,069,375, column 10, lines 48–66. In each instance, the increase in diameter of the wire due to the coating process is about 3.8 to 4.2 mils.

The resulting coated wires are evaluated according to recognized test methods described in columns 4 and 5 of U.S. Patent 2,787,603, and found comparable in dielectric strength of the insulation, cut-through temperature, abrasion resistance, and other electrical properties. However, when the wires coated wtih Enamels A and B are compared for flexibility and resistance to refrigerants, such as "Freon 22," monochlorodifluoromethane, Wire Enamel A is greatly superior to Wire Enamel B.

A comparison of the flexibility of wires is made by the Mandrel Pull Test, which consists of taking about 3 feet of coated 18 gauge copper wire, clamping it at one end and holding in the vertical position, and attaching a three pound weight to the other end. The wire is looped once about a 0.2 inch diameter mandrel near the clamped end and the mandrel is pulled downward. The wire is then examined for coating breaks. Wires coated with Enamels A and B are tested at 13° F., 20° F., and 45° F. At each test temperature, the wires coated with Enamel A showed no signs of cracking or peeling of the coating, while all the wires coated with Wire Enamel B exhibited significant cracking of the enamel coating and are considered failures.

Coated wires A and B are also tested for their resistance to "Freon." This test consists of taking a 6 foot length of coated wire and placing the wire in an oven at 140° C. for 4 hours, then the wire is placed in an aerosol tube which is partially evacuated. The tube containing the wire is placed in a freezing bath and the tube is filled half full with liquid refrigerant "Freon 22." The tube is submerged in a second bath which is at 25° C. for a period of 16 hours and is returned to the freezing bath for removal of the wire from the refrigerant. One minute after removal from the refrigerant, the test wire is suspended in a convection oven at 140° C. for 5 minutes and then removed for visual examination of the coating. The coating is checked for blistering, swelling and discoloration. The wire coated with Enamel A has excellent resistance to swelling and discoloration and had only about 7 blisters in the 6 foot length of wire, while the wire coated with Enamel B showed discloration, i.e., it turned yellow, and showed excessive blistering of the coating. The wire coated with Enamel B had about 70 blisters in a 6 foot length.

Example 2

Latex C is prepared using the identical constituents and procedure used in Example 1 to prepare Latex A except the "Ludox" colloidal silica is omitted. The resulting latex has a total solids content of about 32% and a pH of about 7.0 to 7.5.

Wire Enamel C is formulated from Latex C by using the identical procedure and constituents as used to formulate Wire Enamel A in Example 1. No. 18 gauge copper wire is coated with Wire Enamel C by the procedure of Example 1. The resulting coated wire is evaluated by the test procedure of Example 1 and has comparable dielectric strength, cut-through temperature, abrasion resistance, flex resistance, and "Freon" resistance to the wire coated with Wire Enamel A of Example 1.

Example 3

Latex D is prepared by first forming a carboxylic polymer latex having the composition of 63:32:3:2, acrylonitrile:butyl acrylate:methacrylic acid:glycidyl methacrylate, according to the procedure of Example 1 of Sanders U.S. Patent 2,787,561. This carboxylic polymer latex is treated with air according to the procedure of Example 1 and is iminated with the theoretical amount of propylenimine necessary to react with about ⅓ of the pendent carboxyl groups of the polymer.

The completed latex has a total solids content of 32%, a pH of about 7.0 to 7.5.

Wire Enamel D is formulated from Latex D by using the identical procedure and constituents as used in Example 1 to form Wire Enamel A. No. 18 gauge copper wire is coated with Wire Enamel D by the procedure of Example 1. The resulting coated wire is evaluated by the test procedure of Example 1 and has comparable dielectric strength, cut-through temperature, abrasion resistance, flex resistance, and "Freon" resistance to the wire coated with Wire Enamel A of Example 1.

Example 4

Latex E is prepared by first forming a carboxylic polymer latex having the composition of 4.5/28.7/56.5/10.3, methacrylic acid:butyl acrylate:acrylonitrile:styrene according to the procedure of Example 3 of Bullitt et al. U.S. Patent 3,069,375. This carboxylic polymer latex is treated with air according to the procedure of Example 1 and is iminated with the theoretical amount of propylenimine necessary to react with about ⅓ of the pendant carboxyl groups of the polymer. The completed latex has a total solids content of 32%, and a pH of about 7.0 to 7.5.

Wire Enamel E is formulated from Latex E by using the identical procedure and constituents as used in Example 1 to form Wire Enamel A. No. 18 gauge copper wire is coated with Wire Enamel E by the procedure of Example 1. The resulting coated wire is evaluated by the test procedure of Example 1 and has comparable dielectric strength, cut-through temperature, abrasion resistance, flex resistance, and "Freon" resistance to the wire coated with Wire Enamel A of Example 1.

Example 5

A metal protective coating composition is formed by combining the following ingredients:

| | Parts by weight |
|---|---|
| Latex A of Example 1 (32 solids) | 320 |
| "Bakelite BRL-1100" water-dilutable heat-reactive phenol/formaldehyde condensate solution (66% solids) | 33 |
| "Teflon" polytetrafluoroethylene (50% solids) aqueous suspensoid | 300 |
| Total | 653 |

This coating is deposited from an aqueous dispersion and is cured at a temperature of 400° F. to 500° F. and exhibits many of the desirable characteristics found in "Teflon" polytetrafluoroethylene resin coatings which are deposited from an aqueous suspensoid and cured by fusion at sintering temperatures.

In the above composition, the particulate polytetrafluoroethylene functions as an inert pigment in the coalesced copolymer product coating The dispersed particulate polytetrafluoroethylene provides the cured coating with increased chemical resistance, release properties and lubricity. Coatings having these characteristics are useful in metal protection and are particularly useful for coating cartridge cases which are subject to severe exposure conditions.

Example 6

A metal primer composition was prepared as follows:

| | Parts by weight |
|---|---|
| Latex A (32% solids) | 51.0 |
| Tetramethylene sulfone | 6.4 |
| Phosphoric acid | .7 |
| Water | 41.9 |
| Total | 100.0 |

A plain steel metal panel was sanded and washed with toluene and dried. It was then dipped into the above primer composition and the excess was allowed to drain. The dipped panel was baked 30 minutes at 350° F.

The dry film thickness was .5 mil. The dry film had excellent adhesion to the metal and good impact resistance. The primed metal surface provided an excellent substrate for subsequent application of conventional lacquer and synthetic resin finishes, such as, e.g., automotive finishes.

The above coating compositions of this invention may be further modified by the addition of plasticizers, stabilizers, pigments, extenders and other film formers.

I claim:

1. A novel aqueous dispersion of a water-insoluble interpolymer prepared by
   (1) treating a latex of a water-insoluble carboxylic polymer with at least 10 cubic centimeters of air per pound of latex; said carboxylic polymer consisting essentially of monomer units of (A) 1 to 15% by weight of said carboxylic polymer of at least one alpha,beta-unsaturated carboxylic acid, (B) 30 to 80% by weight of at least one nitrile of the formula

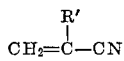

wherein R' is from the group of hydrogen and methyl; (C) 15 to 65% by weight of an ester of the group of acrylic and methacrylic acid esters of a $C_1$ to $C_8$ saturated aliphatic monohydric alcohol;
   (2) reacting the treated carboxylic polymer latex with sufficient alkylene imine of the formula

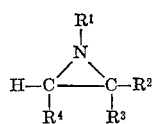

to react about 10–50% of the pendent COOH groups to form a negatively charged polymer having attached to carbon atoms of the polymer backbone pendent monovalent radicals selected from the group consisting of radical A of the formula

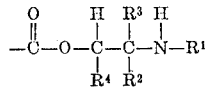

radical B of the formula

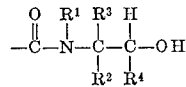

and a mixture of radicals A and B wherein each of said formulas $R^1$ is selected from the group consisting of hydrogen, benzyl and $C_1$ to $C_5$ alkyl radicals, $R^2$ and $R^3$ are selected from the group consisting of hydrogen, benzyl, aryl and $C_1$ to $C_5$ alkyl radicals, and $R^4$ is selected from the group consisting of hydrogen and $C_1$ to $C_5$ alkyl radicals.

2. The aqueous dispersion of claim 1 prepared by treating said latex of a carboxylic polymer with about 20 to 80 cubic centimeters of air per pound of latex and reacting with sufficient alkylene imine to react about 10–25% of the pendent carboxyl groups.

3. The aqueous dispersion of claim 1 prepared by treating said latex of a carboxylic polymer with about 10 to 200 cubic centimeters of air per pound of latex over a period of 15 minutes to 3 hours.

4. The aqueous dispersion of claim 3 stabilized by treatment wits sufficient ammonium hydroxide to provide the latex with a pH of 5 to 8.

5. The aqueous dispersion of claim 1 in which said carboxylic polymer further includes 1 to 25% by weight of said carboxylic polymer of copolymerizable vinylidene unsaturated monomer units selected from the group of aromatic hydrocarbons having from 1 to 2 vinylidene groups per molecule, and a glycidol derivative selected from the group of esters of alpha-olefinic monocarboxylic acid with 2,3-epoxy-propanol-1 and allyl glycidyl ether.

6. The aqueous dispersion of claim 3 admixed with about 1 to 40% based on the weight of said polymer of at least one water-dilutable, heat-reactive formaldehyde condensate selected from the group consisting of water-dilutable reactive condensates of phenol/formaldehyde, ketone/formaldehyde, ketone/urea/formaldehyde, urea/formaldehyde, melamine/formaldehyde, and urea/melamine/formaldehyde.

7. The aqueous dispersion of claim 1 admixed with about 1 to 150% based on the weight of said polymer of a water-soluble, volatile, organic liquid, having a rate of volatilization less than that of water and which is a solvent for said polymer.

8. The aqueous dispersion of claim 6 in which said water-dilutable heat-reactive condensate is a phenol/formaldehyde condensate present in an amount from 3% to 15 % based on the weight of said polymer.

9. The aqueous dispersion of claim 8 in which the carboxylic polymer consists essentially of monomer units of (A) 2% to 10% by weight of methacrylic acid, (B) 23% to 45% by weight of butyl acrylate and (C) 45% to 75% by weight of acrylonitrile and in which $R^1$, $R^3$ and $R^4$ are hydrogen and $R^2$ is selected from the group consisting of hydrogen and methyl.

10. The aqueous dispersion of claim 1 which contains about 0.1 to 5% by weight based on the weight of said polymer alkali stabilized colloidal silica particles having a particle diameter of about 5 to 150 millimicrons.

11. The aqueous dispersion of claim 1 in which the alkylene imine is selected from the group consisting of ethylenimine and propylenimine.

12. A novel dispersion of claim 1 of a water-insoluble interpolymer prepared by
   (1) forming a latex of a water-insoluble carboxylic polymer consisting essentially of (A) 2 to 10% by weight methacrylic acid, (B) 23 to 45% of butyl acrylate and (C) 45 to 75% by weight of acrylonitrile;
(2) adjusting the latex to a pH of about 5–7 with ammonium hydroxide;
(3) treating the ammonically adjusted latex with about 20 to 80 cubic centimeters of air per pound of latex;
(4) reacting the treated carboxylic polymer latex with sufficient alkylene imine selected from the group consisting of ethylenimine and propylenimine to react about 10 to 25% of the pendent COOH groups to form a negatively charged polymer having attached to the carbon atoms of the polymer backbone pendent monovalent radicals selected from the group consisting of radical C of the formula

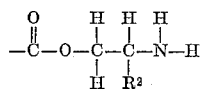

radical D of the formula

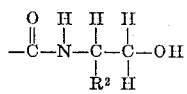

and a mixture of radicals C and D wherein $R^2$ is selected from the group consisting of hydrogen and methyl;
(5) mixing with the iminated latex about 3 to 15% by weight of a water-dilutable heat reactive condensate of phenol/formaldehyde;
(6) stabilizing the resulting dispersion by adjusting the pH to 7.5–8 with ammonium hydroxide.

13. The aqueous dispersion of claim 12 in which said latex of a water-insoluble carboxylic polymer has dispersed therein about 0.1 to 5% by weight based on the weight of said polymer of an alkali stabilized colloidal silica having a particle diameter of about 5 to 150 millimicrons.

References Cited

UNITED STATES PATENTS

| | | | |
|---|---|---|---|
| 2,866,763 | 12/1958 | Sanders | 260—80.8 |
| 2,976,203 | 3/1961 | Young et al. | 260—29.6 |
| 3,069,375 | 12/1962 | Bullitt et al. | 260—29.3 |
| 3,113,038 | 12/1963 | Lattarulo | 260—29.6 |

FOREIGN PATENTS 461,354   2/1937   Great Britain.

MURRAY TILLMAN, *Primary Examiner.*

J. C. BLEUTGE, *Assistant Examiner.*